COMBINED BASE SOCKETS AND TERMINAL BOARDS

Filed Feb. 20, 1953

INVENTORS
THOMAS J. DIMARCO
HARRY W. HEIGHTON
BY
Reynolds, Beach & Christensen
ATTORNEYS United States Patent Office 2,744,214

Patented May 1, 1956

2,744,214

COMBINED BASE SOCKETS AND TERMINAL BOARDS

Thomas J. Di Marco, Seattle, and Harry W. Heighton, Renton, Wash., assignors to Boeing Airplane Company, Seattle, Wash., a corporation of Delaware Application February 20, 1953, Serial No. 338,004

10 Claims. (Cl. 317—101)

This invention relates to mountings for electric circuit components and more especially concerns a combined vacuum tube base socket and terminal board by which interconnected wires and electric circuit components such as resistors, condensers, etc. may be installed in a desirable physical relationship to each other and to the one or more base sockets and related elements making up the electrical apparatus. The invention is herein illustratively described by reference to the preferred form thereof but it will be understood that certain changes and modifications therein may be made without departing from underlying essentials comprising the inventive subject matter.

It has been conventional practice to provide terminal boards or strips inside the electronic chassis of radio, television, radar, and similar electrical devices, so as to provide a convenient and orderly arrangement of connecting wires, resistors, condensers, and other components connected in circuit with vacuum tubes or other electric discharge devices employed in the apparatus. An orderly, standardized arrangement of the circuit components and connections not only simplifies and reduces possible mechanical errors of production but also makes for easier testing of the apparatus as well as minimizing variations in stray capacitance and mutual coupling effects which would tend to impair the stability and reliability of operation of the apparatus. To a certain extent, short electrical connections or circuit leads are permitted thereby.

The past practice referred to has been to mount an elongated insulating plate or strip along the interior or back side of the chassis plate upon which the vacuum tube base sockets are mounted, with the plane of the insulating plate perpendicular to the chassis plate and with the plate ordinarily disposed parallel to but offset a short distance from the one or more vacuum tube base sockets with which the terminal board is most directly associated. Parallel rows of soldering terminals or lugs extending along the opposite longitudinal edges of the terminal board then served as the means by which resistors, condensers and other circuit components were readily connected or installed in physically parallel relationship extending transversely to the plate between the opposite sets of soldering terminals at desired locations along the length of the terminal board. Such installations could be made either before or after mounting of the terminal board in the electronic chassis, depending upon the merits of preassembly techniques in given cases. Moreover, the remaining circuit wiring connections to the individual soldering terminals from other soldering terminals or points in the circuit could then be made in a relatively orderly fashion, with a relatively wide-open and accessible arrangement and grouping of wires and avoiding the actually or apparently unplanned and confusing maze of interlaced wires and circuit components running in all directions sometimes found in electronic circuit apparatus.

An object of the present invention is to provide a terminal board and a combination terminal board and vacuum tube base socket arrangement which further simplifies the wiring in electronic circuit chassis and which in general constitutes an improvement upon the aforementioned terminal board arrangement in the above-mentioned and other respects.

Another object is to provide a combined vacuum tube base socket and terminal board which may be preassembled and in preassembled form may include resistors, condensers and other circuit components already connected to the terminal board soldering terminals and/or to the base socket soldering lugs before the combined unit is actually mounted in the chassis of an electronic device.

Still another object is to obtain the advantages of a terminal board type of circuit wiring arrangement or circuit physical construction as described above with still shorter interstage connections than in the previous practice, and with greater compactness of the overall wiring arrangement than could be achieved in the past, especially as to the depth of the space required in an electronic chassis in a direction perpendicular to the chassis plate upon which the vacuum tube base sockets and the terminal boards are mounted.

Another object is a combination terminal board and base socket adapted for quick and easy assembly with electronic circuit apparatus.

Still another object is to achieve such advances largely and basically with manufactured elements now existing and available commercially which can be readily revised or adapted for the purposes at hand where desired.

A feature of the invention is the mounting of an insulating terminal board with its body plane disposed parallel to the chassis plate serving as the support for the one or more vacuum tube base sockets to which such terminal board is to be associated most directly, rather than mounting such board perpendicular to such plate as in the past, and additionally the provision in the terminal board of an aperture in registry with each such base socket so mounted in the chassis. The terminal board soldering terminals, preferably arranged in parallel rows extending along respectively opposite sides of the terminal board project perpendicularly from the board face in a direction away from the chassis wall and furthermore project substantially beyond the free ends of the base socket soldering lugs. Thus although these lugs project through such aperture, as is to be preferred, resistors, condensers and other circuit components may be connected directly between soldering terminals in opposite rows on the terminal board without hindrance from the base socket soldering lugs and yet the latter are readily accessible for making soldered connections to them and for applying test probes for circuit testing. In general the arrangement is one of layering of the wiring connections, terminal board and components mounted thereon generally parallel to the chassis wall, so that while the connections are open and accessible the overall effect is one of compactness and directness and shortness of connections.

These and other features, objects and advantages of the invention will become more fully evident from the following description of specific embodiments thereof with reference to the accompanying drawings.

Figures 1, 2, 3, 4:
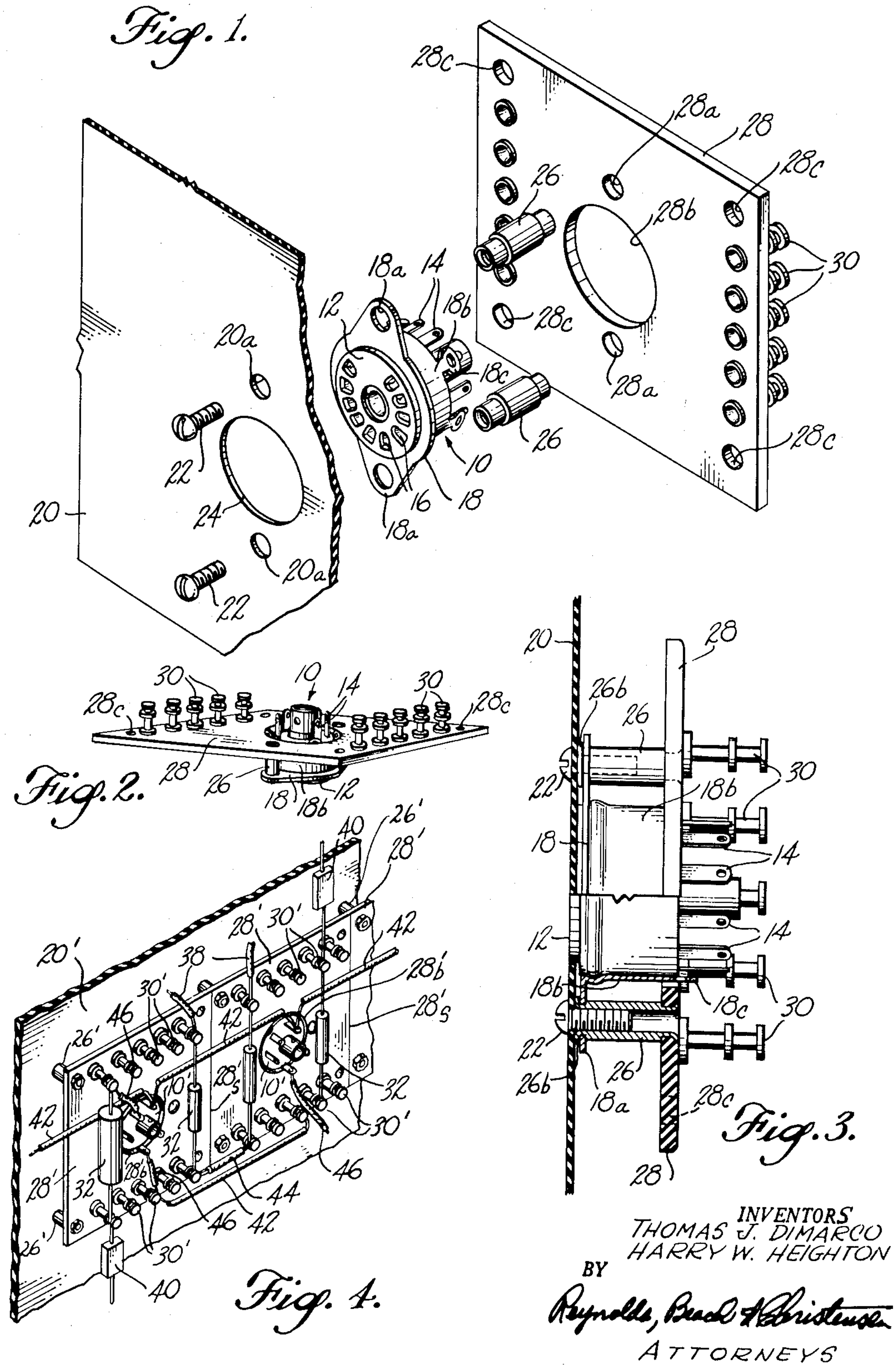
Figure 1 is a perspective view of the elements of the combination terminal board and electric discharge device base socket as well as a section of chassis plate prepared for the mounting of such a combination thereon.
Figure 2 is a perspective view of the unmounted combination terminal board and base socket.
Figure 3 is a side view, partly in section of the combined base socket and terminal board mounted upon a chassis plate.
Figure 4 is a perspective view of the back side of a chassis plate with an integrated multiple-section terminal board and a series of vacuum tube base sockets combined therewith and mounted on a chassis wall, together with a few representative circuit components and wiring connections illustrating a preferred mode of applying the invention.

The illustrative electric discharge device base socket 10 is of a conventional octal base type having a generally cylindrical insulating body 12 with a group of soldering lugs 14 projecting from one end face thereof and corresponding socket holes 16 in the opposite end face. Reception of the prongs of a vacuum tube or other electric discharge device (not shown) in the socket holes 16 establishes electrical contact of the individual prongs with the different soldering lugs by virtue of lug-connected contact elements internal to the socket holes. A metal ring 18 fixedly encircling the insulating body 12 has apertured tabs or ears 18*a* which project oppositely from the socket body and form mounting means by which the base socket is secured to a chassis wall, such as plate 20. Screw holes 20*a* in the plate are spaced apart for registry with the holes shown in the mounting tabs 18*a* so as to receive machine screws 22 passed through both sets of holes for mounting purposes. A large aperture 24 in the plate 20 then lies in registry with the end face of the base socket having the socket holes 16 so that the latter are accessible from the exterior side of the chassis to receive a vacuum tube or other electric discharge device. The soldering lugs 14 project freely into the space on the interior side of the chassis wall 20. In the illustrated form of base socket the ring 18 has a metal skirt 18*b* provided with soldering lugs 18*c* affording convenient terminals for making soldered ground connections.

A conventional octal base socket as described above would be mounted on a chassis plate 20 in the manner indicated normally by applying securing nuts to the projecting ends of the machine screws 22 passed through the aligned apertures in the plate and in the mounting tabs 18*a*. However, in the preferred application of the present invention the ends of the machine screws 22 thread instead into the open ends of the post-like spacer or supporting elements 26 which have been peened over as indicated at 26*b* (Figure 3) against the faces of tabs 18*a* which lie adjacent the plate 20. The end portions of spacers 26 are of reduced external diameter so as to pass through the holes in tabs 18*a* and to form shoulders abutting the opposite faces of these tabs, so that when peened over the spacers will be permanently locked to the respective tabs and will project perpendicularly from the plane of ring 12.

The reduced opposite ends of the spacers 26 are of a size to pass through holes 28*a* in the insulating plate 28 comprising the terminal board. These ends of the mounting spacers 26 are likewise peened over so as to bear against the face of the insulating plate 28 and lock the plate in fixed positional relationship to the socket base 10.

Of any suitable insulating material, such as Micarta, used in the manufacture of conventional terminal boards, the particular material selected being relatively unimportant for purposes of the invention, the substantially flat and rigid or practically rigid plate 28 is preferably rectangular or square in outline form and is provided with a series of soldering terminals 30 secured to the plate along opposite edges thereof at convenient spacings. A central aperture 28*b* in the plate 28, of a size somewhat larger than the cross-sectional size of the base socket 10, receives the end of the socket carrying the soldering lugs 14 so that these lugs project through the aperture for accessibility from the opposite or chassis-interior side of the terminal board 28. However, it is important that the soldering terminals 30 project from such opposite side of the plate 28 and substantially beyond the projecting ends of the soldering lugs 14 in the mounted position of the plate 28 relative to the base socket 10. In other words it is desirable that the effective length of the spacing supports 26 by which the plate 28 is secured in fixed relationship with the socket base 10 be such that the plane of the plate is established substantially parallel to the chassis wall 20 and that the soldering terminals 30 project away from the plate by a greater amount than the soldering lugs 14 project through and beyond the aperture 28*b* in such plate.

The chief reason for having the soldering terminals 30 project appreciably beyond the soldering lugs 14 as illustrated in Figure 3 is to permit conveniently mounting circuit components such as resistors, condensers, etc., generally designated 32 in Figure 4, as directly as possible between soldering terminals 30 in the opposite rows of such terminals in the usual manner of mounting such components on terminal boards without hindrance from or to the socket lugs 14 nor the direct connections made to these lugs. The difference in the amount of projection of the terminals 30 and soldering lugs 14 is preferably made ample to conveniently accommodate these circuit components layered over the lugs 14 and lug connections. However, for reasons of compactness and for shortness of electrical connections, and like considerations, it is preferred that the plate 28 be mounted as close to the chassis wall 20 as possible, or that the over-projection of terminals 30 beyond lugs 14 be no greater than necessary for the above purposes.

Such an arrangement of elements and of the circuit components connected between soldering terminals 30 does not materially hinder the making of soldered connections to the soldering lugs 14, however, nor of reaching these soldering lugs with test probes and the like, because usually it is readily possible to establish the locations of the circuit components longitudinally of the parallel rows of soldering lugs so as to leave open spaces where needed for such access.

If desired, a set of holes 28*c* at the corners of the terminal board plate 28 may be provided for use in mounting the plate in fixed relation to an electronic circuit chassis by means other than with spacers 26 connected to the mounting tabs 18*a* of a base socket. These and other possibilities in the mode of mounting the terminal board in fixed parallel relationship with the chassis wall and in superposed registry with a base socket in accordance with the described arrangement will be apparent.

In Figure 4 there is illustrated an arrangement of circuit components, wiring connections and the like representative of a preferred mode of application of the invention. Furthermore, this figure illustrates a modification of the invention. The terminal board insulating plate 28′ in this figure in effect constitutes an integral series of unitary terminal boards similar to the type illustrated in Figure 1, so as to function as a composite terminal board used in conjunction with a series of vacuum tube base sockets 10′ mounted on a chassis plate 20′, with the lugs of such sockets projecting through the respective board apertures 28′*b*, as shown. In this case the insulating plate 28′ is a multiple of the length of the plate 28 in Figure 1 (measured lengthwise of the series of soldering terminals 30). Preferably such multi-length plate is provided with transverse weakening or score lines 28′*s* produced in the manufacture of the terminal board which permit the board alternatively to be used as an integrated multiple-section board as illustrated in Figure 4, or to be broken into separate unitary sections by bending the board so as to cause it to break along the score lines for use of each section separately in the manner illustrated in Figures 1 and 2. Basically, i. e. without the aperture 28′*b* for instance, such terminal boards are commercially available for use in the former manner described at the outset. By very little alteration therein such boards may advantageously be adapted for the purposes of this invention at low cost. In Figure 4 the post-like spacing supports 26′ are positioned directly between chassis wall 20′ and complementally apertured corners of plate sections, instead of being connected to the mounting tabs of vacuum tube sockets.

The resistors, condensers or other circuit elements designated 32 are shown connected in physically parallel relationship between the opposite rows of soldering terminals 30' extending along the opposite longitudinal edges of the terminal board plate 28'. These circuit components are installed so as to lie in one general layer overlying the ends of the lugs 14 of the series of base sockets 10'. Connecting wires 38 and coupling condensers 40 soldered to different individual soldering terminals 30 extend therefrom in the same general layer, or otherwise, to points (not shown) in the circuit, while interstage wiring connections such as those designated 42 established directly between soldering lugs of the successive base sockets in the series lie generally in an underlying layer. The wiring connection 44 illustrates the convenience of establishing connections between soldering terminals at different locations in one row of such terminals on the board, while the wires 46 illustrate the convenience of establishing connections from individual soldering lugs on the base sockets to external points (not shown) in the associated circuit apparatus.

From the arrangement of the few representative connections and circuit components illustrated in Figure 4, it will be seen that a layering of components and wiring connections results. Obviously the connections in different circuit apparatus will vary and variations may also be made in the way in which connections are made in a particular circuit apparatus depending upon preference. In all cases, however, the aperturing and peculiar placement of the terminal board produces a wiring arrangement which is very compact, especially in the direction of depth measured perpendicular to the plane of the chassis plate 20 or 20' due to the spreading out and layering of components, i. e. generally parallel to the plate 20. Furthermore because the terminal board is superposed directly upon the base socket the interstage connections and wiring connections between terminal board soldering terminals and the base socket soldering lugs are relatively short. All circuit points or connections are accessible for purposes of soldering or unsoldering the connections and also for purposes of applying test probes in order to conduct circuit tests. Because of the spreading out of components and connections in layers and in series arrangement, standardized orderly wiring procedures may be established and readily followed in the mass production of electronic apparatus. Moreover, individual circuit subassemblies may be manufactured by soldering certain circuit components and connecting wires directly to the soldering board and/or the base sockets associated therewith preliminary to assembly with the electronic chassis.

We claim as our invention:

1. In combination, an electric discharge device base socket of the type having an insulating body with soldering lugs projecting from one end face of said body and respectively connected to prong-engageable contacts accessible from the opposite end face thereof, and further having mounting means fixedly secured to said insulating body, a substantially flat and rigid plate of dielectric material of larger face area than said first end face and having an aperture therein at least approximately as large as said first end face, means connected to said mounting means and said plate fixedly supporting said apertured plate in substantially parallel relationship with said first end face and in a position of registry of said aperture therewith causing said soldering lugs to project through said plate aperture, and two substantially parallel rows of soldering terminals carried by said dielectric plate, extending along respectively opposite sides of said aperture, said plate soldering terminals projecting from the side of said plate opposite said insulating body substantially to beyond the projecting ends of said soldering lugs to permit mounting of circuit components extending directly between said rows of soldering terminals and between said soldering terminals and said soldering lugs.

2. The combination defined in claim 1, wherein the plate is of elongated substantially rectangular form, with the rows of soldering terminals arranged along respectively opposite long edges of said plate, such rows being of a length materially in excess of the diameter of the first end face of the insulating body, permitting electric circuit components to be mounted between correspondingly situated soldering terminals in the respective rows of soldering terminals at at least one end of said rows without overlying said soldering lugs.

3. A terminal board for electronic circuit apparatus including a plurality of electric discharge device base sockets in series arrangement and of the type having mounting elements thereon and a group of soldering lugs projecting from one end face thereof, said terminal board comprising an elongated substantially rectangular insulating plate, said plate having a plurality of apertures therein arranged in series spaced apart along its length and situated generally intermediate its long edges, said apertures being of the order of size of the base socket end face, means on each such plate section adapting the same for mounting in fixed positional relationship to such base sockets in substantially parallel relationship with the end faces of such socket and with the plate section apertures lying respectively in registry with the end face of such sockets to permit the groups of soldering lugs on said sockets to project through said apertures, and two rows of soldering posts mounted on said plate in substantially parallel relationship extending along respectively opposite long edges thereof on opposite sides of said series of apertures, said soldering posts projecting from the side of said plate generally opposite said base sockets mounted thereon.

4. A terminal board for electronic circuit apparatus including one or more electric discharge device base sockets in series arrangement and of the type having mounting elements thereon and a group of soldering lugs projecting from one end face thereof, said terminal board comprising an elongated substantially rectangular insulating plate having apertures therein generally intermediate its long edges of the order of size of the base socket end faces, a plurality of soldering terminals fixedly mounted on said insulating plate and projecting from one side thereof in parallel rows extending along respectively opposite sides of at least one of said apertures, and means on said plate including a plurality of elements on the side thereof opposite said soldering terminals adapting said plate for mounting in fixed positional relationship to a plurality of substantially coplanar base sockets arranged with the end faces thereof in registry with the respective plate apertures to permit said groups of soldering lugs to project through said apertures, respectively, said plate mounting elements being of an effective length spacing said plate relative to said base sockets for projection of said soldering terminals beyond the projecting ends of said soldering lugs thereby.

5. The terminal board defined in claim 4, wherein the soldering terminals are arranged in straight parallel rows extending along the respectively opposite longitudinal edges of the rectangular plate.

6. A terminal board for electric circuit components and wiring connections cooperatively arranged with an electric discharge device base socket of the type provided with a group of soldering lugs on one end face thereof, said terminal board comprising a substantially flat plate of rigid form having an aperture therein generally intermediate the edges thereof at least substantially as large as the end face of the base socket to permit the group of soldering lugs thereof to project through said aperture with said plate mounted substantially parallel to such end face, and two substantially straight parallel rows of separately insulated soldering terminals projecting from one side of said plate, said rows extending along respectively opposite sides of said aperture.

7. The terminal board defined in claim 6, wherein the plate is substantially rectangular and of electrically insulating material, providing the insulation between soldering terminals projecting therefrom, and wherein the length of the rows of soldering terminals materially exceeds the diameter of the aperture.

8. The combination defined in claim 6, and a plurality of electric circuit elements connected in physically parallel relationship between soldering terminals in the respective rows of such terminals to extend transversely to said rows.

9. In electronic circuit apparatus of the type having a series of substantially coplanar electric discharge device base sockets mounted in one wall of a chassis and having soldering lugs projecting interiorly of said chassis, mounting means fixed in relation to said chassis wall having a plurality of substantially parallel rows of soldering terminals fixedly supported thereby in a common general plane extending substantially parallel to said chassis wall along respectively opposite sides of said series of base sockets and spaced inwardly of the chassis from said base socket soldering lugs, and a plurality of electric circuit components connected electrically between opposite soldering terminals in the respective rows and physically extending directly between such terminals transversely to said rows to occupy said common general plane.

10. In electronic circuit apparatus of the type having an electric discharge device base socket mounted in one wall of a chassis and having soldering lugs projecting interiorly of said chassis, mounting means fixed in relation to said chassis wall having a plurality of substantially parallel rows of soldering terminals fixedly supported thereby in a common general plane extending substantially parallel to said chassis wall along respectively opposite sides of said base socket and spaced inwardly of the chassis from said base socket soldering lugs, and a plurality of electric circuit components connected electrically between opposite soldering terminals in the respective rows and physically extending directly between such terminals transversely to said rows to occupy said common general plane, said mounting means comprising a plate having an opening therein registering with the base socket and of a size at least substantially as large as such base socket affording direct access to the soldering lugs thereon from the chassis interior.

References Cited in the file of this patent

UNITED STATES PATENTS

| | | |
|---|---|---|
| 2,195,180 | Marzetti | Mar. 26, 1940 |
| 2,531,085 | Stacey | Nov. 21, 1950 |
| 2,624,775 | Hughes | Jan. 6, 1953 |

FOREIGN PATENTS

| | | |
|---|---|---|
| 223,402 | Great Britain | Oct. 23, 1924 |
| 562,577 | Great Britain | July 7, 1944 |